July 22, 1947.  R. A. BAUDRY ET AL  2,424,299
GENERATOR
Filed Jan. 13, 1945  2 Sheets-Sheet 1

WITNESSES:
Edward Michaels

INVENTORS
René A. Baudry &
Harry E. Criner.
BY O.B.Buchanan
ATTORNEY

July 22, 1947.  R. A. BAUDRY ET AL  2,424,299
GENERATOR
Filed Jan. 13, 1945  2 Sheets-Sheet 2

WITNESSES:
Edward Michaele

INVENTORS
René A. Baudry &
Harry E. Criner.
BY
O. B. Buchanan
ATTORNEY

Patented July 22, 1947

2,424,299

UNITED STATES PATENT OFFICE 2,424,299

GENERATOR

René A. Baudry, Wilkinsburg, and Harry E. Criner, Forest Hills, Pa., assignors to Westinghouse Electric Corporation, East Pittsburgh, Pa., a corporation of Pennsylvania Application January 13, 1945, Serial No. 572,612

7 Claims. (Cl. 171—252)

Our invention relates to the stator-members of alternating-current dynamo-electric machines, and it has particular relation to the stator-core and frame-construction of large synchronous machines, particularly turbo-generators.

The principal object of our invention is cost-reduction, to devise an improved structural arrangement whereby the best use may be made of the smallest amount of material, and whereby the structure is susceptible of being assembled, by the shop, in a minimum of time, and hence at a minimum cost.

The frame-members of large turbo-generators are invariably of fabricated construction; that is, they are built up out of a large number of separate pieces of steel (or other structural material) which are welded together. At about two-foot intervals along the axial length of the machine, the frame is provided with ring-members, all welded into place, and welded to suitable axially disposed spacing-struts and other axially disposed frame-members, so that a skeleton-structure is provided. It is impossible to fabricate such a structure with such accuracy that the bores of the several ring-members are accurately aligned within more than, say, half an inch, which is too great a tolerance to be accepted in the construction of the finished machine. The very act of welding introduces a certain amount of shrinkage or distortion of the welded members, as is well known. Hence, it has become the practice, for many years, to place the assembled frame on an immense boring-machine, and to accurately bore out the inner diameter of the several rings along the length of the frame. In some cases, the length of the frame has exceeded the capacity of available boring-machines, and it has been necessary to cut the frame in half, in order to bore it, and then to weld the two halves together again. After the frame has been accurately bored, the stator-core member may be assembled therein.

A basic object of our present invention is to provide a construction utilizing rings which are bored before fabricating the stator-frame, and which do not need to be bored after the frame is assembled with a large number of rings axially displaced at intervals of two feet, more or less. A careful review and analysis of the essentials of turbo-generator frame-construction has convinced us that the essential function of the boring in situ, that is with the rings assembled in place in the big machine, is to accurately line up the inner diameters of the several rings, in order to satisfactorily support, or provide clearances for, the stack of laminations which comprise the stator-core member.

An important object of our invention is to provide a construction in which accurately formed rings are provided, and are lined up in the correct supporting-relationship to the core, and are then connected to the welded structure which comprises the outer stator-frame. In this way, we avoid the necessity for the costly boring of the stator-frame after it is assembled. In large high-speed (hence two-pole) generators which are driven by steam turbines, the core would be spring-supported within the outer stator-frame. In other synchronous machines, the core would be rigidly supported in the frame.

In the accompanying drawing, Figure 1 is a fragmentary side view, partly in longitudinal section, showing a turbo-generator embodying our invention;

Figure 3:
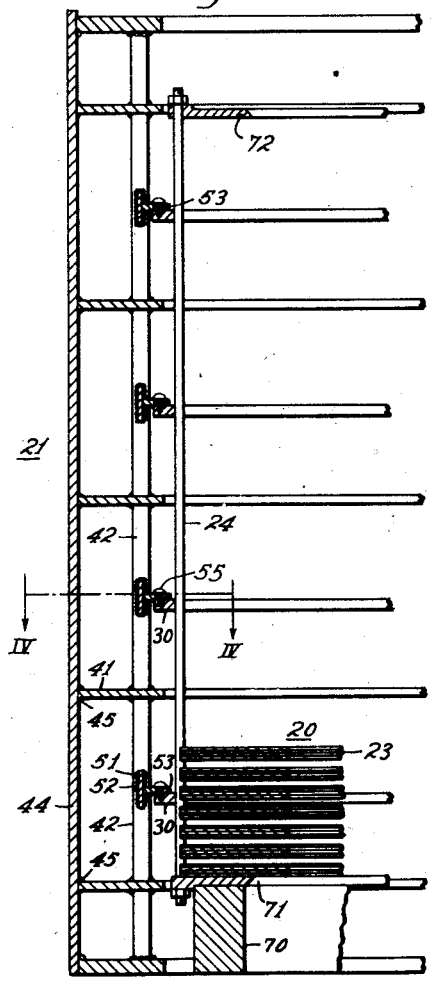
Fig. 3 is a fragmentary longitudinal sectional view, illustrating the manner in which the stator-member of the machine is assembled.
Figure 5:
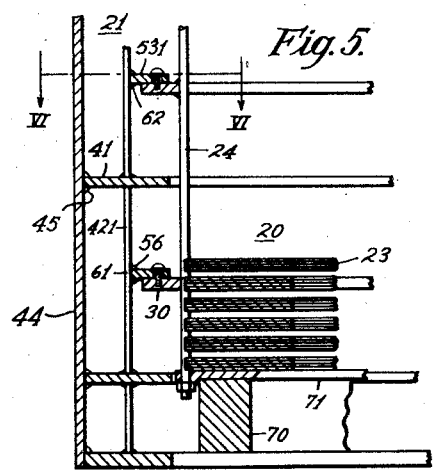
Figure 6:
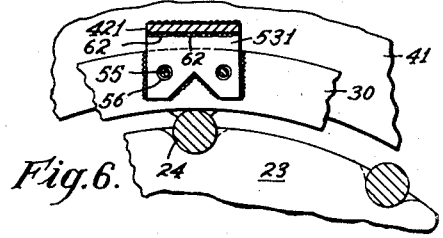
Figure 7:
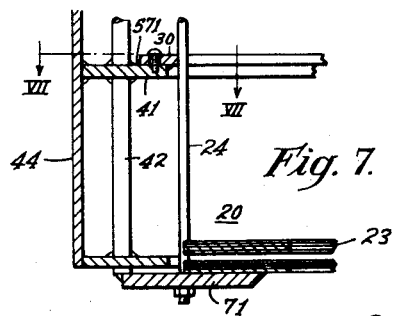
Figure 4:
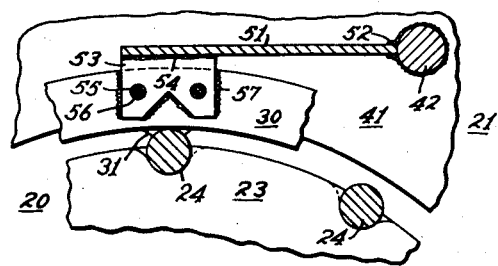
Fig. 4 is a detail-view of the spring-means for supporting the core-supporting rings, the section-plane being indicated by the line IV—IV in Fig. 3.
Figure 8:
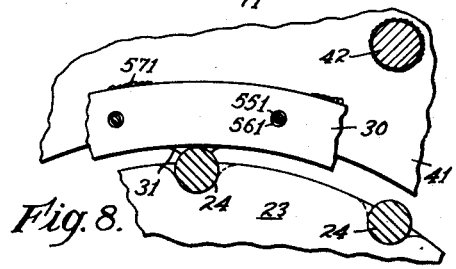

Figs. 5 and 6 are fragmentary views showing a modification of the structure indicated in Figs. 3 and 4, whereby the spring-support is obtained in a different way; and Figs. 7 and 8 are similar views illustrating a different form of embodiment, in which the core-supporting rings are rigidly secured to the frame-rings.

In Figures 1 to 4 of the drawing, we have illustrated an embodiment of our invention in a preferred form of construction of a turbo-generator, which comprises a stator-member 10 and a rotor-member 11. The rotor-member is rotatably supported within the stator-member and is shown as comprising a direct-current field-winding 12 for exciting the poles of the machine, a horizontal shaft 13, slip-rings 14 and a bearing 15 for rotatably supporting each end of the shaft 13 on a pedestal 16 which is mounted on the foundation 17.

The stator-member 10 comprises a stator-core 20, an outer frame 21 surrounding said stator-core, and an alternating-current winding 22 carried by said stator-core. The stator-core 20 is built up of overlapping segmental punchings 23 which are stacked on a pluraltiy of axially extending rib-members 24, which may be 1½" building-bolts, or other means. Preferably, the outer peripheries of said punchings 23 are interlockingly keyed to the rib-members 24, the particular keying-means shown on the drawing being of the type which is described and claimed in a Noden patent, No. 1,795,882, granted March 10, 1931, and assigned to the Westinghouse Electric & Manufacturing Company, although other interlocking keying-arrangements are known and available.

Fitting closely around said core-supporting rib-members 24 are a plurality of pre-formed, identical core-supporting rings 30, spaced at intervals of 20 to 24 inches (more or less) at intermediate points along the axial length of the core. In the finished structure, each rib-member 24 is welded to the inner periphery or bore of each core-supporting ring 30, by welded joints 31.

The outer frame 21 is a fabricated structure, usually welded, having a plurality of axially spaced frame-rings 41, a plurality of axially extending strut-members 42 which are welded between successive frame-rings 41, in positions which are spaced from both the outer and inner diameters of said frame-rings, in the preferred form of embodiment of our invention, although other positions of the strut-members are possible. An outer sheeting 44 is also provided, around the outer peripheries of the frame-rings 41, being usually welded to each of the frame-rings, as indicated at 45. It will be understood that this fabricated structure of outer sheeting, frame-rings, and struts may be as massive as may be necessary to support the weight of the stator-core and to withstand the forces placed thereon.

Finally, according to our invention, a suitable form of supporting-means is provided, for supporting each of the core-supporting rings 30 from the outer frame 21.

In the machine shown in Figs. 1 to 4, the core-ring supporting-means is in the form of a resilient support or mounting, which is adopted for reasons explained in the Baudry Patent No. 2,320,843, granted June 1, 1943. In the construction shown in Figs. 1 to 4, the spring-mounting is obtained by means of tangentially disposed beam-springs 51, which are welded, at an end 52, to an intermediate point in each strut 42, intermediate between two of the frame-rings 41. The struts 42, in this form of embodiment of our invention, are relatively rigid members, but the beam-springs 51 are of a cross-section which is relatively thin in a radial direction and relatively broad in an axial direction, so as to provide considerable resiliency in the radial direction, a smaller amount of resiliency in an axial direction, and considerable stiffness in a tangential direction.

Each beam-spring 51 is secured, at a point tangentially removed from the welded end 52, to one of the core-supporting rings 30, the attachment being made by means of a flange-plate 53, which is welded to the beam-spring 51 as shown at 54, and which is secured to the core-supporting ring 30 by two means, one securing-means being in the form of a bolt or bolts 55 which fit through enlarged holes 56 in the plate 53, so as to admit of some adjustment, to provide a temporary holding-means which is useful during the assembly-operation in the shop, when the structure is being lined up properly, and also when the bolts are loosened (in some cases) to release strains which may have been set up during various welding-operations. A second and final securing-means is provided, after the final adjustments have been made, this final securing-means being preferably in the form of a welded joint 57 between the plate 53 and the core-supporting ring 30.

Figure 1:
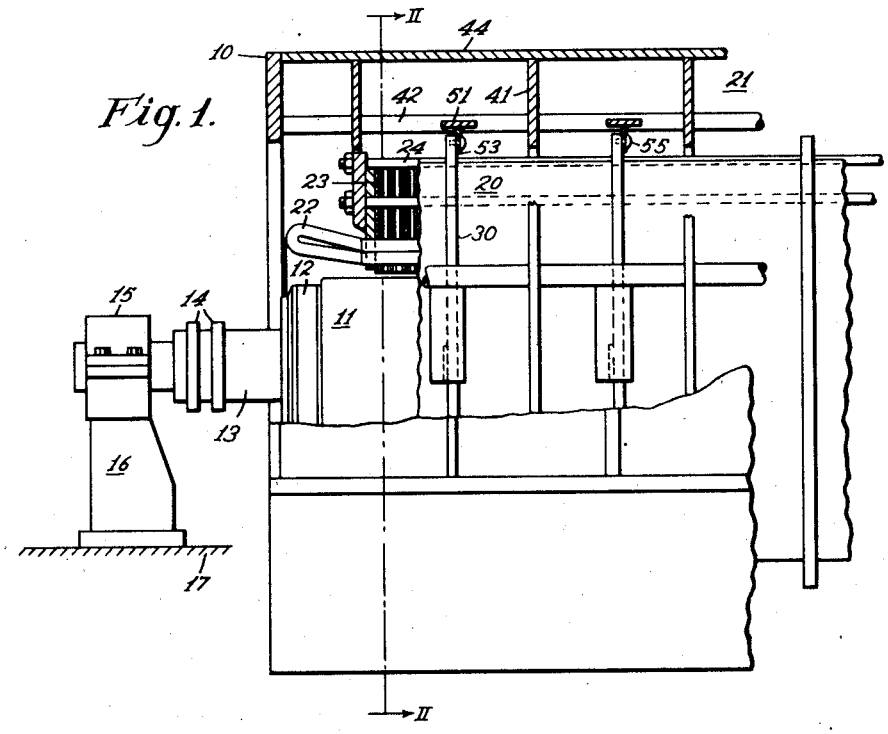
Figure 2:
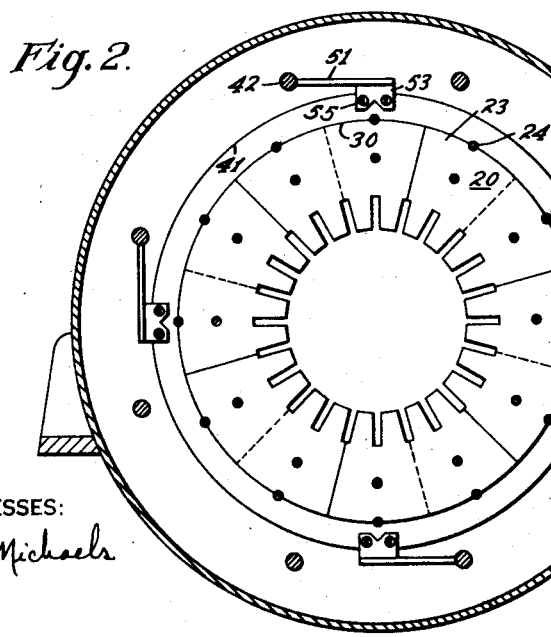
Fig. 2 is a transverse sectional view of an unwound stator-member according to Fig. 1, the section-plane being indicated by the line II—II in Fig. 1.

Each core-supporting ring 30 is supported by its own set of tangential springs 51. Preferably as shown in Fig. 2, there are four tangential springs 51, spaced about the circumference of each core-supporting ring 30, two of these tangential springs being vertical springs, at the sides of the core, for sustaining the weight of the core, while the other two springs are disposed in a horizontal position at the top and the bottom of the core, to assist in resisting the tangentially applied torque of the core, while at the same time preventing lateral displacements of the core, in a horizontal lateral direction. From an economical standpoint, it is quite desirable that only a relatively small number of springs 51 shall be utilized, for each core-supporting ring 30. It is not necessary, and hence not economically desirable, to provide a spring 51 for each of the core-supporting rib-members 24, the number of rib-members disposed about the periphery of the core being much larger than the number of tangential springs 51.

In the alternative form of embodiment of our invention which is shown in Figs. 5 and 6, the axially-disposed frame-struts 42 are spring-struts 421, having a cross-sectional shape which is thin in a radial direction and relatively broad in a tangential direction, so that the center-point 61 of such a spring is readily yieldable, or resilient, in a radial direction, considerably less yieldable in a tangential direction, and substantially rigid in an axial direction. The center-points 61 of these axially disposed spring-struts 421, in Figs. 5 and 6, are secured to the several core-supporting rings 30 by means of plates 531, which are welded to the spring-struts 421 at 62, and which are secured to the core-supporting rings in the manner already described in connection with the plates 53 in the preferred form of construction of our invention. As before, each core-supporting ring 30 has its own set of spring-supports. Preferably, two of these spring-supports, for each core-supporting ring, are disposed with the flat sides of the spring-struts 421 in a vertical direction, so that the tangential rigidity of these spring-struts will sustain the weight of the core. The other spring-struts, at other points around the circumference of the core-supporting rings 30, resist the tangentially applied torques and prevent horizontal lateral displacement of the core, as before.

Figs. 7 and 8 show still another form of embodiment of our invention, which is useful in synchronous machines other than turbo-generators. Here, the stator-core 20 is not spring-supported, and the core-supporting rings 30 are secured rigidly to corresponding frame-rings 41, preferably by means of two kinds of joints, one a temporary bolted-joint 551, extending through enlarged holes 561 in the core-supporting ring 30, and the other a welded joint 571 between the core-supporting ring 30 and the corresponding frame-ring 41, corresponding to the previously described elements 55, 56 and 57 of Figs. 3 and 4.

A partially finished stator-member has been shown, turned on end, in the process of manufacture, in Figs. 3, 5 and 7. It is usual to stack the laminations or punchings 23, with the stator-member standing on end, so that the guide-bolts or rib-members 24 are vertical. To temporarily support the stator-core 20 in the proper position relative to the outer frame 21, during this operation, a supporting-block 70 may be used, as shown in Figs. 3 and 5. It is usually necessary to provide some sort of guiding-means to keep the core straight during this stacking-process, as otherwise the long guiding-ribs 24 might bend out into a wavy conformation. In this connection, our core-supporting rings, and also our aforesaid spring-mounting means, and our temporary adjustable bolted connection 55—56 or 551—561, serve an extremely useful purpose in cutting down on the shop-time necessary to line up and assemble the machine, thus materially reducing the overall cost of the machine.

The several core-supporting rings 30 are first connected to the bolts 55 (or 551) which are carried by the spring-supports 53 (or 531), or by the frame-rings 41, as the case may be. The core-supporting rings 30 are properly lined up with their bores all in proper alignment, and then the temporary holding-bolts 55 (or 551) are tightened up. This is done before the punchings 23 are stacked into place. The rib-members 24 are properly lined up, in directions parallel to the axis, in their properly spaced positions inside of the inner peripheries or bores of the rings 30, said rib-members being inserted, at their ends, through suitable end-plates 71 and 72 (Fig. 3) which are disposed at the ends of the stator-core 20.

The stator-punchings 23 are then assembled on the guide-ribs 24. These guide-ribs may be welded, at 31, to the core-supporting rings 30, either before or after the punchings 23 are put in place, but preferably, the punchings are first stacked up to approximately the height of a core-supporting ring, before that ring is welded to the several guide-ribs 24, and then the stack is built up to the height of the next core-supporting ring 20, before that ring is welded to the guide-ribs 24, and so on throughout the length of the machine, the bores of the core-supporting rings being utilized as an aligning-abutment against which the guide-ribs are pressed, while the punching-segments 23 are being pushed into place, during the stacking-operation, before the guide-ribs 24 are welded to the several core-supporting rings 30. It will be noted that the relative tangential rigidity of the spring-support effectually holds the core-supporting rings 30 against being pushed out of alignment, during this core-stacking operation.

As each core-supporting ring 30 is welded at 31 to the guide-ribs 24, during the process of manufacturing the stator-core 20, the temporary holding-bolts 55 (or 551) may be momentarily loosened, so as to relieve any strains that may have been introduced by the welded joints 31, or for the purpose of checking the alignment, and then the bolts may be retightened and a permanently fixed joint may be made, by means of a row or rows or welding at 57 (or 571), to supplement the bolts 55 (or 551).

While a particular shop-procedure has just been described, it will be obvious that various variations are available, to be used as a shop-foreman may wish. The provision of the preformed core-supporting rings 30 gives the shop-foreman a structural possibility which facilitates his task of maintaining the necessary proper alignment of the stator-core 20, during the stacking operation.

It will be apparent that the same general assembly-procedure is available, for all three forms of embodiment of our invention, which have been illustrated.

An important, although not essential, feature of our invention, is that we may utilize interspersed frame-rings 41 and core-supporting rings 30, the core-supporting rings being pre-formed to have identical inner diameters, while the inner diameters of the frame-rings 41 are not held accurate within such close limits. By building the frame-rings with an inner diameter which is intermediate between the inner and outer diameters of the core-supporting rings 41, the outer diameters of the frame-rings 41 being considerably larger than the outer diameters of the core-supporting rings 30, the maximum possible strength of core may be achieved, with a minimum overall diameter, thus avoiding the necessity for building the outer frame 21 large enough so that the core-supporting rings 30 may be inserted into place after the outer frame-structure is completed.

With our construction, utilizing the interspersed frame-rings 41 and core-supporting rings 30, these rings are first put together in the desired order of arrangement. The several frame-rings 41 are then separated, and held in their separated positions, by means of the axially disposed strut-members 42, which are welded into place, in positions which are spaced from the outer diameters of both the frame-rings and the core-supporting rings 30. The outer sheeting 44 may then be applied around the outer diameters of the frame-rings 41, and welded into place as indicated at 45. The core-supporting rings 30 may be then temporarily held in position, as previously described, and the stator-core may be built up inside of the core-supporting rings 30, as already described.

While we have described several preferred forms of embodiment of our invention, we wish it to be understood that the invention is quite general, in some of its aspects, and we do not wish to be understood as limiting ourselves to these particular forms of embodiment. We desire, therefore, that the appended claims shall be accorded the broadest construction consistent with their language.

We claim as our invention:

1. An alternating-current dynamo-electric machine comprising a stator-member, and a rotor-member rotatably supported within said stator-member, said stator-member comprising a stator-core, an outer frame surrounding said stator-core, and an alternating-current winding carried by said stator-core, said stator-core being built up of punchings, a plurality of axially extending rib-members, the outer peripheries of said punchings being keyed to said rib-members, a plurality of identically bored core-supporting rings fitting closely around said rib-members at axially spaced points, welded joints between said core-supporting rings and said rib-members, said outer frame having a plurality of axially spaced frame-rings, a plurality of axially extending strut-members secured to said frame-rings at points removed from the outer peripheries of said frame-rings, and an outer sheeting around the outer peripheries of said frame-rings, and supporting-means for supporting each of a plurality of said core-supporting rings from said outer frame, the supporting-means for each of a plurality of said core-supporting rings comprising a plurality of circumferentially distributed connecting-members, each connecting-member being joined at one point or points to a core-supporting ring, and joined at another point or points to an axially extending strut-member at an intermediate point between two frame-rings.

2. The invention as defined in claim 1, characterized by said axially extending strut-members being of a cross-section which is relatively thin in a radial direction and relatively broad in a tangential direction.

3. The invention as defined in claim 1, characterized by each connecting-member comprising a substantially tangentially disposed elongated spring-member.

4. The invention as defined in claim 1, characterized by each connecting-member comprising a substantially tangentially disposed beam-spring portion having a cross-section which is relatively thin in a radial direction and relatively broad in an axial direction.

5. An alternating-current dynamo-electric machine comprising a stator-member, and a rotor-member rotatably supported within said stator-member, said stator-member comprising a plurality of interspersed frame-rings and core-supporting rings, all axially spaced from each other, intermediate of the ends of the machine, the core-supporting rings having identical inner diameters, the outer diameters of the frame-rings being larger than the outer diameters of the core-supporting rings, an outer sheeting welded to the outer peripheries of the frame-rings, means for securing each of said core-supporting rings from the welded assembly consisting of said frame-rings and said outer sheeting, a plurality of axially extending rib-members, a stator-core comprising a stack of punchings having their outer peripheries keyed to said rib-members, supporting-means for supporting each rib-member from said core-supporting rings at a plurality of axially spaced points along each rib-member, and an alternating-current winding carried by said stator-core.

6. An alternating-current dynamo-electric machine comprising a stator-member, and a rotor-member rotatably supported within said stator-member, said stator-member comprising a plurality of interspersed frame-rings and core-supporting rings, all axially spaced from each other, intermediate of the ends of the machine, the core-supporting rings having identical inner diameters, the outer diameters of the frame-rings being larger than the outer diameters of the core-supporting rings, an outer sheeting welded to the outer peripheries of the frame-rings, means for securing each of said core-supporting rings from the welded assembly consisting of said frame-rings and said outer sheeting, a plurality of axially extending rib-members fitting within the inner diameters of said core-supporting rings, a stator-core comprising a stack of punchings having their outer peripheries keyed to said rib-members, welded joints between said rib-members and said core-supporting rings, and an alternating-current winding carried by said stator-core.

7. The invention as defined in claim 6, characterized by the means for securing each core-supporting ring from said welded assembly comprising one or more adjustable temporary bolted joints and one or more fixed permanently serving joints.

RENÉ A. BAUDRY.
HARRY E. CRINER.

REFERENCES CITED

The following references are of record in the file of this patent:

UNITED STATES PATENTS

| Number | Name | Date |
| --- | --- | --- |
| 1,194,232 | Raymond | Aug. 8, 1916 |
| 1,689,503 | Savage | Oct. 30, 1928 |
| 2,199,351 | Taylor | Apr. 30, 1940 |